(12) United States Patent
Ananthanarayanan et al.

(10) Patent No.: US 7,476,824 B2
(45) Date of Patent: Jan. 13, 2009

(54) WELDING APPARATUS FOR RESISTANCE WELDING HEAT EXCHANGER TUBE TO TUBESHEET

(75) Inventors: Venkatasubramanian Ananthanarayanan, Beavercreek, OH (US); Andrzej Marian Pawlak, Rochester Hills, MI (US); James M. Payne, Lennon, MI (US); Deepak K. Sharma, Troy, MI (US); Kenneth E Johnson, South Lyon, MI (US)

(73) Assignee: Delphi Technologies, Inc., Troy, MI (US)

( * ) Notice: Subject to any disclaimer, the term of this patent is extended or adjusted under 35 U.S.C. 154(b) by 42 days.

(21) Appl. No.: 11/169,331

(22) Filed: Jun. 28, 2005

(65) Prior Publication Data

US 2006/0006148 A1    Jan. 12, 2006

Related U.S. Application Data

(60) Provisional application No. 60/585,966, filed on Jul. 7, 2004.

(51) Int. Cl.
  *B23K 11/00* (2006.01)
(52) U.S. Cl. .................................. 219/59.1; 219/78.16
(58) Field of Classification Search ................ 219/59.1, 219/78.16, 61.11, 78.01
  See application file for complete search history.

(56) References Cited

U.S. PATENT DOCUMENTS

| | | | |
|---|---|---|---|
| 1,292,812 A | 1/1919 | Lachman | |
| 2,106,272 A | 1/1938 | Elsey | |
| 2,277,871 A | 3/1942 | Mitchell et al. | |
| 2,326,296 A | 8/1943 | Harrison | |
| 2,447,259 A | 8/1948 | Lucke | |
| 2,614,198 A | * 10/1952 | Avery et al. | 219/107 |
| 2,824,212 A | 2/1958 | Roberts | |
| 3,503,474 A | 3/1970 | Raab | |

(Continued)

FOREIGN PATENT DOCUMENTS

DE    2806287    8/1979

(Continued)

OTHER PUBLICATIONS

Resistance Welding Encyclopedia Britannica Online http://www.search.eb.com/eb/article?query=resistance+welding&eu=78503&.

*Primary Examiner*—Kevin P Kerns
(74) *Attorney, Agent, or Firm*—Patrick M. Griffin

(57) ABSTRACT

Welding apparatus includes a first electrode having an electrode surface adapted to contact an outward end fold of a heat-exchanger tube which is positioned in an orifice of a tubesheet with the fold contacting an outward-facing side of the tubesheet. A second electrode has an electrode surface adapted to contact the outward-facing side of the tubesheet. Another welding apparatus includes a first electrode having an electrode surface adapted to contact an end of a heat exchanger tube positioned in an orifice of a tubesheet. The first electrode is movable to create an outward end fold in the tube and deform the fold against the outward-facing side of the tubesheet. Another welding apparatus includes a second electrode having an electrode surface adapted to contact the outward-facing side of a tubesheet and having cutouts which surround each of a plurality of heat-exchanger tubes and which are adapted to receive a first electrode.

5 Claims, 10 Drawing Sheets

U.S. PATENT DOCUMENTS

| | | | |
|---|---|---|---|
| 3,585,345 A | 6/1971 | Jepersen | |
| 3,618,817 A | 11/1971 | Troughton | |
| 3,784,260 A | 1/1974 | Araya | |
| 3,784,778 A | 1/1974 | McPherson et al. | |
| 4,185,369 A | 1/1980 | Darrow et al. | |
| 4,231,488 A | 11/1980 | Ward et al. | |
| 4,269,106 A | 5/1981 | Leibhard et al. | |
| 4,273,983 A | 6/1981 | Ogawa et al. | |
| 4,322,598 A | 3/1982 | Blair | |
| 4,408,112 A | 10/1983 | Kazlauskas | |
| 4,427,869 A | 1/1984 | Kimura et al. | |
| 4,480,166 A | 10/1984 | Leech | |
| 4,496,410 A | 1/1985 | Davis et al. | |
| 4,514,614 A | 4/1985 | Stol | |
| 4,648,811 A | 3/1987 | Tahata et al. | |
| 4,676,427 A | 6/1987 | Constance | |
| 4,677,271 A | 6/1987 | Opprecht | |
| 4,769,624 A | 9/1988 | Merritt et al. | |
| 5,204,491 A | 4/1993 | Aureal et al. | |
| 5,374,800 A | 12/1994 | Yoneda | |
| 5,386,923 A | 2/1995 | Nakashima et al. | |
| 5,538,076 A | 7/1996 | Nishida et al. | |
| 5,540,192 A | 7/1996 | Xanders | |
| 5,649,039 A | 7/1997 | Benzoni et al. | |
| 5,786,548 A | 7/1998 | Fanucchi et al. | |
| 5,831,235 A | 11/1998 | Cecil | |
| 5,896,960 A | 4/1999 | Ananthanarayanan | |
| 6,089,617 A | 7/2000 | Craig et al. | |
| 6,130,502 A | 10/2000 | Kobayashi et al. | |
| 6,186,696 B1 | 2/2001 | Valin | |
| 6,287,513 B1 | 9/2001 | Grady et al. | |
| 6,370,740 B1 | 4/2002 | Foreman | |
| 6,390,124 B1 | 5/2002 | Kido et al. | |
| 6,476,543 B1 | 11/2002 | Mera et al. | |
| 6,539,837 B2 | 4/2003 | Fanelli et al. | |
| 6,552,294 B1 | 4/2003 | Ananthanarayanan et al. | |
| 6,586,110 B1 | 7/2003 | Obeshaw | |
| 6,615,488 B2 | 9/2003 | Anders et al. | |
| 6,623,048 B2 | 9/2003 | Castel et al. | |
| 6,654,995 B1 | 12/2003 | Wang et al. | |
| 6,689,981 B1 | 2/2004 | Ananthanarayanan et al. | |
| 6,693,251 B1 | 2/2004 | Ananthanarayanan et al. | |
| 6,705,438 B2 | 3/2004 | Ananthanarayanan et al. | |
| 6,717,091 B2 | 4/2004 | Ananthanarayanan et al. | |
| 6,791,051 B2 | 9/2004 | Ananthanarayanan et al. | |
| 6,791,052 B1 | 9/2004 | Ananthanarayanan et al. | |
| 7,253,372 B2 * | 8/2007 | Ananthanarayanan et al. | 219/59.1 |
| 2002/0008387 A1 | 1/2002 | Vasudeva | |
| 2002/0162651 A1 | 11/2002 | Nakagome et al. | |
| 2003/0196715 A1 | 10/2003 | Sakamoto et al. | |
| 2004/0035504 A1 | 2/2004 | Ananthanarayanan et al. | |
| 2004/0035829 A1 | 2/2004 | Ananthanarayanan et al. | |
| 2004/0035830 A1 | 2/2004 | Ananthanarayanan et al. | |
| 2004/0035832 A1 | 2/2004 | Ananthanarayanan et al. | |
| 2004/0035833 A1 | 2/2004 | Ananthanarayanan et al. | |
| 2004/0035834 A1 | 2/2004 | Ananthanarayanan et al. | |
| 2004/0056001 A1 | 3/2004 | Ananthanarayanan et al. | |

FOREIGN PATENT DOCUMENTS

| | | |
|---|---|---|
| DE | 4209218 | 11/1993 |
| EP | 0884501 | 12/1998 |
| JP | 55-136584 | 10/1980 |
| JP | 55-136593 | 10/1980 |
| JP | 08193577 | 7/1996 |
| JP | 08215859 A | 8/1996 |
| WO | WO 2004/019377 | 3/2004 |
| WO | WO 2004/019377 A2 * | 3/2004 |
| WO | WO 2004/028730 | 4/2004 |

* cited by examiner

WELDING APPARATUS FOR RESISTANCE WELDING HEAT EXCHANGER TUBE TO TUBESHEET

CROSS REFERENCE TO RELATED APPLICATIONS

The present application claims priority of U.S. Provisional Application No. 60/585,966 filed Jul. 7, 2004.

TECHNICAL FIELD

The present invention relates generally to welding, and more particularly to a welding apparatus for resistance welding a heat exchanger tube to a tubesheet.

BACKGROUND OF THE INVENTION

Conventional methods for welding a tube to a tubesheet include gas metal arc welding and gas tungsten arc welding. Gas metal arc welding uses a consumable metal wire as one electrode and the parts as another electrode, and moves the consumable metal wire (or the parts) to draw an arc and weld the parts together. Gas tungsten arc welding uses a non-consumable tungsten alloy electrode to draw an arc and a consumable filler metal wire that is fed into the arc to weld parts together. The welding is accompanied by a gas (such as a mixture of argon and carbon dioxide) to prevent oxidation and stabilize the arc. Such gas metal/gas tungsten arc welding is well known. In a conventional gas metal arc welding technique, solid metal wire or metal core wire (i.e., an annular-solid wire whose core is filled with metal powder such as a mixture of metal, alloy and/or oxide powders) is used with the wire typically at a positive electrical welding potential and with the parts electrically grounded. The welding arc creates a molten weld puddle which results in the welding together of the parts. Gas metal arc welding requires expensive welding equipment, the molten weld puddle tends to flow away from the joint area (depending on the joint position with respect to gravity) resulting in welds of inconsistent quality, and the process requires a long cycle time between welds. The need to precisely position the electrode at the joint and rotate around the tube circumference precisely so that the arc is drawn at the location to be welded is also difficult and time-consuming considering that thousands of tubes may be welded to a tubesheet to form a heat-exchanger. Any lack of precision in positioning the electrode at the joint results in leakers in the heat-exchanger.

Conventional methods for attaching parts together also include friction welding. To join a tube to a plate, the tube is rotated about its longitudinal axis, and the tube end and the plate are pressed together, wherein friction causes heating creating the weld. Friction welding requires expensive welding equipment, and the process requires a long cycle time between welds. Friction welding is not easily applicable to thin-walled tubes because they do not retain their shapes well under heat and pressure. Friction welding is not easily applicable to the manufacture of heat-exchangers, since the tubes are not commonly rotatable after assembly for welding. It is noted that laser and electron-beam welding for the above joints also need expensive equipment and there is the need for precisely positioning and rotating the heat source at the multitude of joints in a heat-exchanger.

What is needed is an improved welding apparatus for welding a heat exchanger tube to a tubesheet.

SUMMARY OF THE INVENTION

A first embodiment of the invention is for a welding apparatus which includes a resistance-welding first electrode and a resistance-welding second electrode. The first electrode has an electrode surface adapted to contact an outward end fold of a heat-exchanger tube which is positioned in an orifice of a heat-exchanger tubesheet with the outward end fold contacting an outward-facing side of the tubesheet. The second electrode has an electrode surface adapted to contact the outward-facing side of the tubesheet.

A second embodiment of the invention is for a welding apparatus which includes a resistance-welding first electrode and a resistance-welding second electrode. The first electrode has an electrode surface adapted to contact an end of a heat exchanger tube disposed in an orifice of a heat-exchanger tubesheet. The second electrode has an electrode surface adapted to contact an outward-facing side of the tubesheet. The first electrode is movable, with respect to the second electrode, to create an outward end fold in the tube and deform the outward end fold against the outward-facing side of the tubesheet.

A third embodiment of the invention is for a welding apparatus including a resistance-welding first electrode and a resistance-welding second electrode. The first electrode has an electrode surface adapted to contact an end portion of at least one of a plurality of heat-exchanger tubes which are disposed in corresponding orifices of a heat-exchanger tubesheet wherein the end portion protrudes from an outward-facing side of the tubesheet. The second electrode has an electrode surface adapted to contact the outward-facing side of the tubesheet and has cutouts which surround each of the plurality of tubes and which are adapted to receive the first electrode.

Several benefits and advantages are derived from one or more of the embodiments of the invention. Welding using electric current is less expensive than gas metal arc welding or friction welding. Welding using electric current also has a shorter cycle time between welds than gas metal arc welding or friction welding. In one example, the first electrode moves to deform the first outward fold against the first tubesheet, wherein such deformation resistance welding allows solid state welds of dissimilar materials without the formation of brittle intermetallic compounds. In one variation, having the first electrode also create the outward fold streamlines the welding process. Having resistance-welding first and second electrodes adapted to contact, respectively, the tube and the tubesheet on the same side of the tubesheet provides for an efficient welding process, as can be appreciated by those skilled in the art.

DETAILED DESCRIPTION

Figure 1:
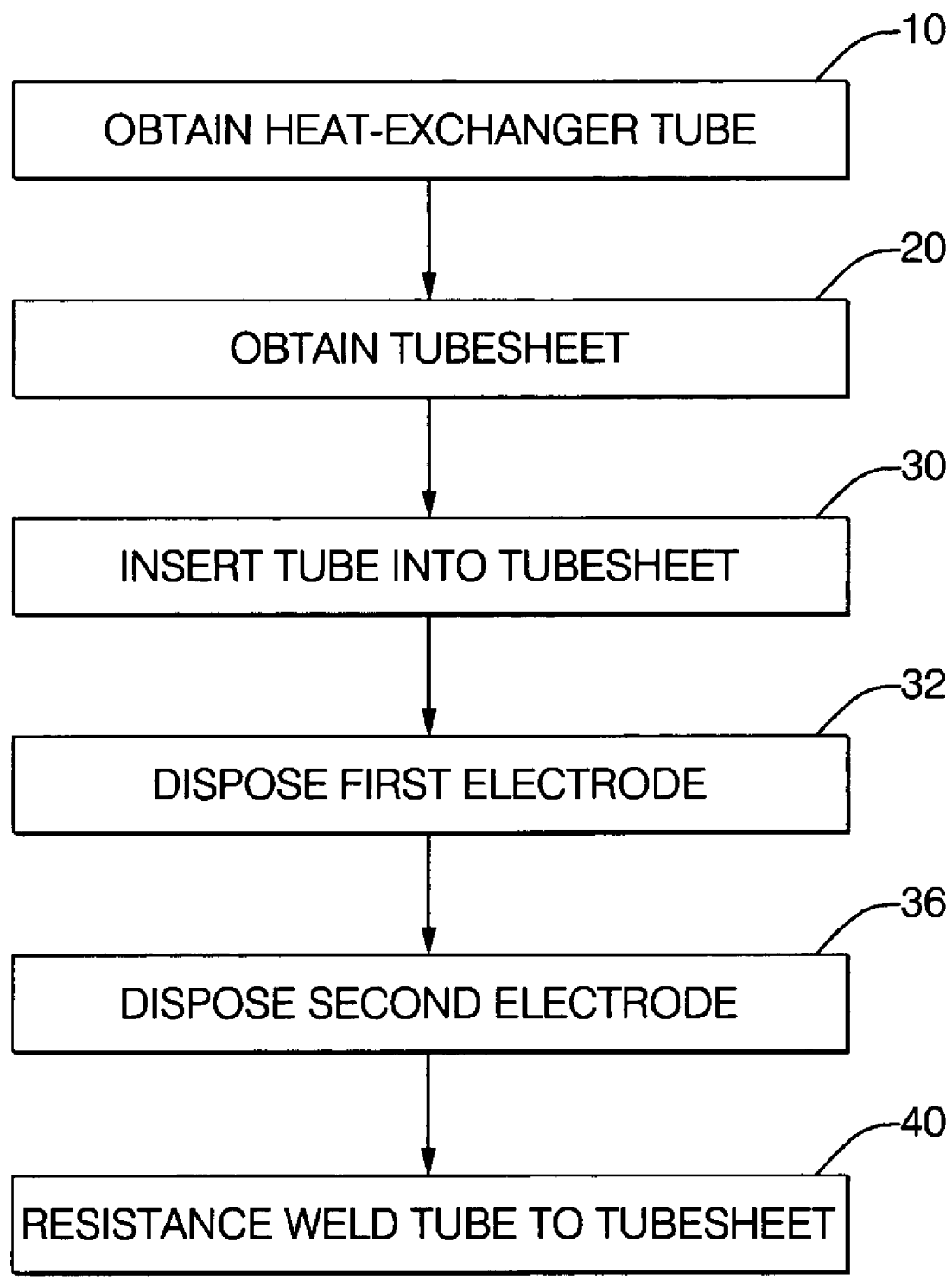
FIG. 1 is a block diagram of a first method of the invention.
Figure 2:
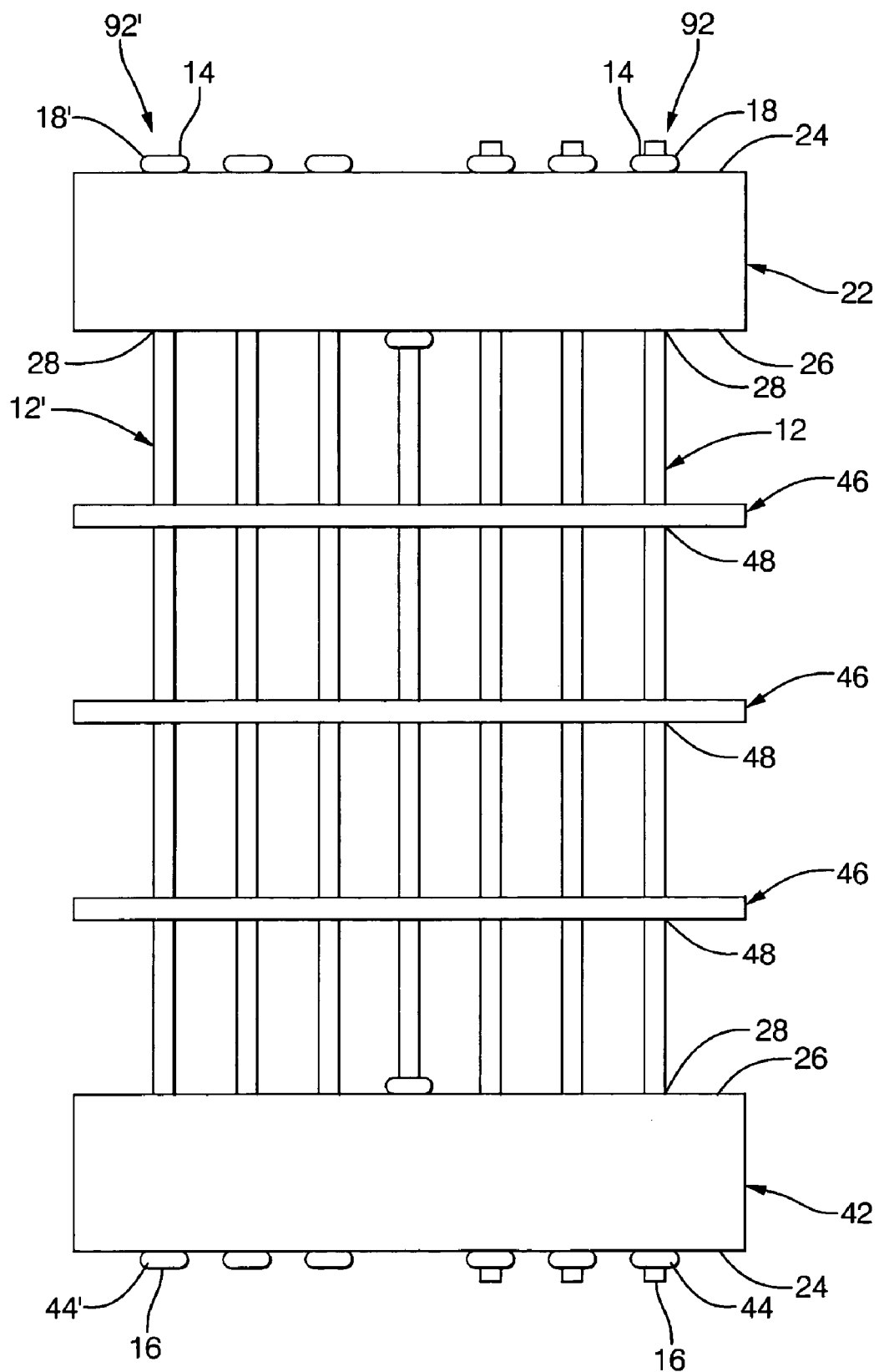
FIG. 2 is a schematic side-elevational view of a first embodiment of a vertically-positioned heat exchanger which includes a plurality of tubes, first and second tubesheets, and three baffles, and which can be assembled in accordance with one example of the first and/or second method of the invention.
Figure 3:
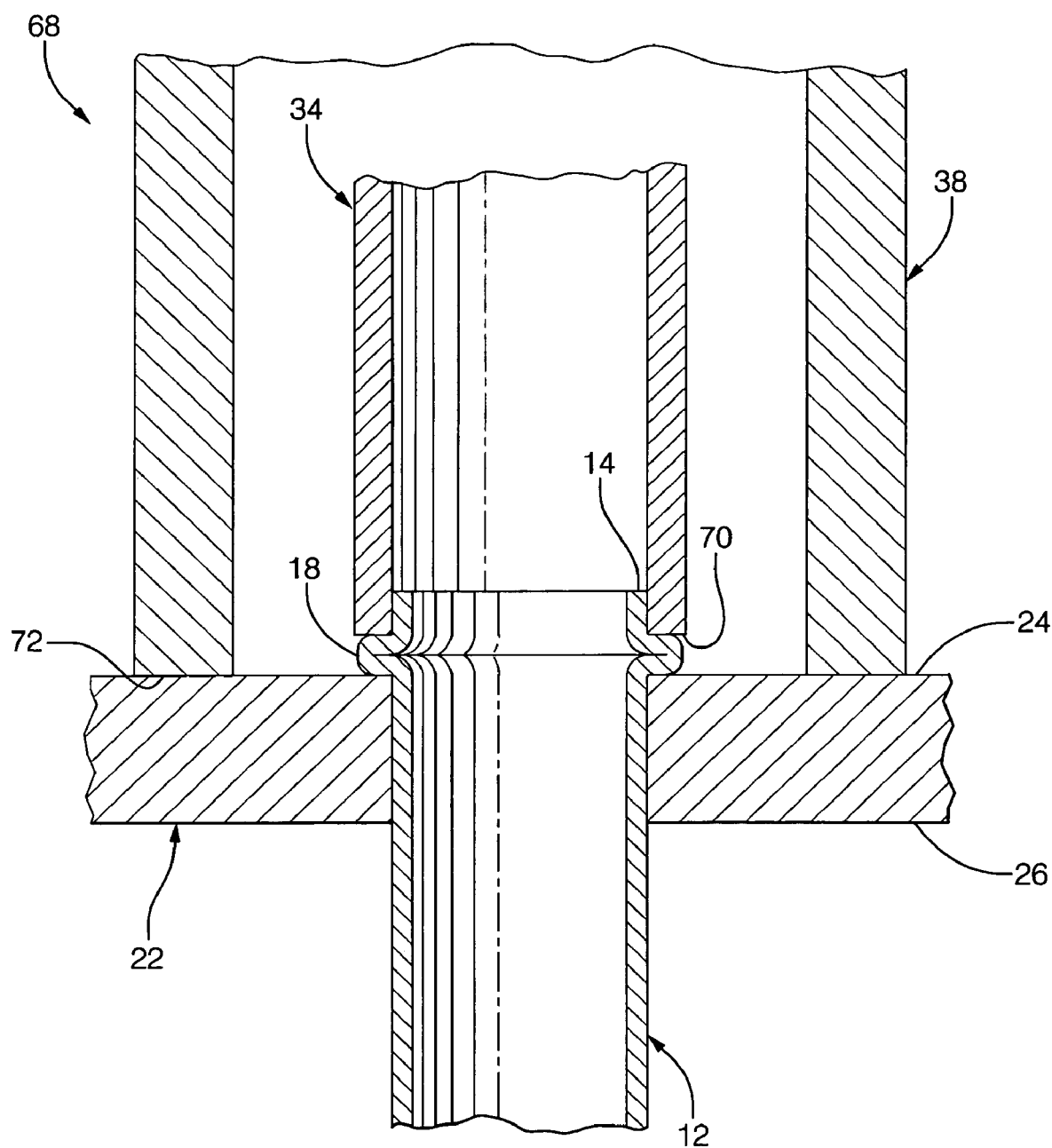
FIG. 3 is a schematic cross sectional view of a first embodiment of first and second electrodes which can be used in welding a heat-exchanger tube to the first and second tubesheets in accordance with one example of the first method of the invention.
Figure 4:
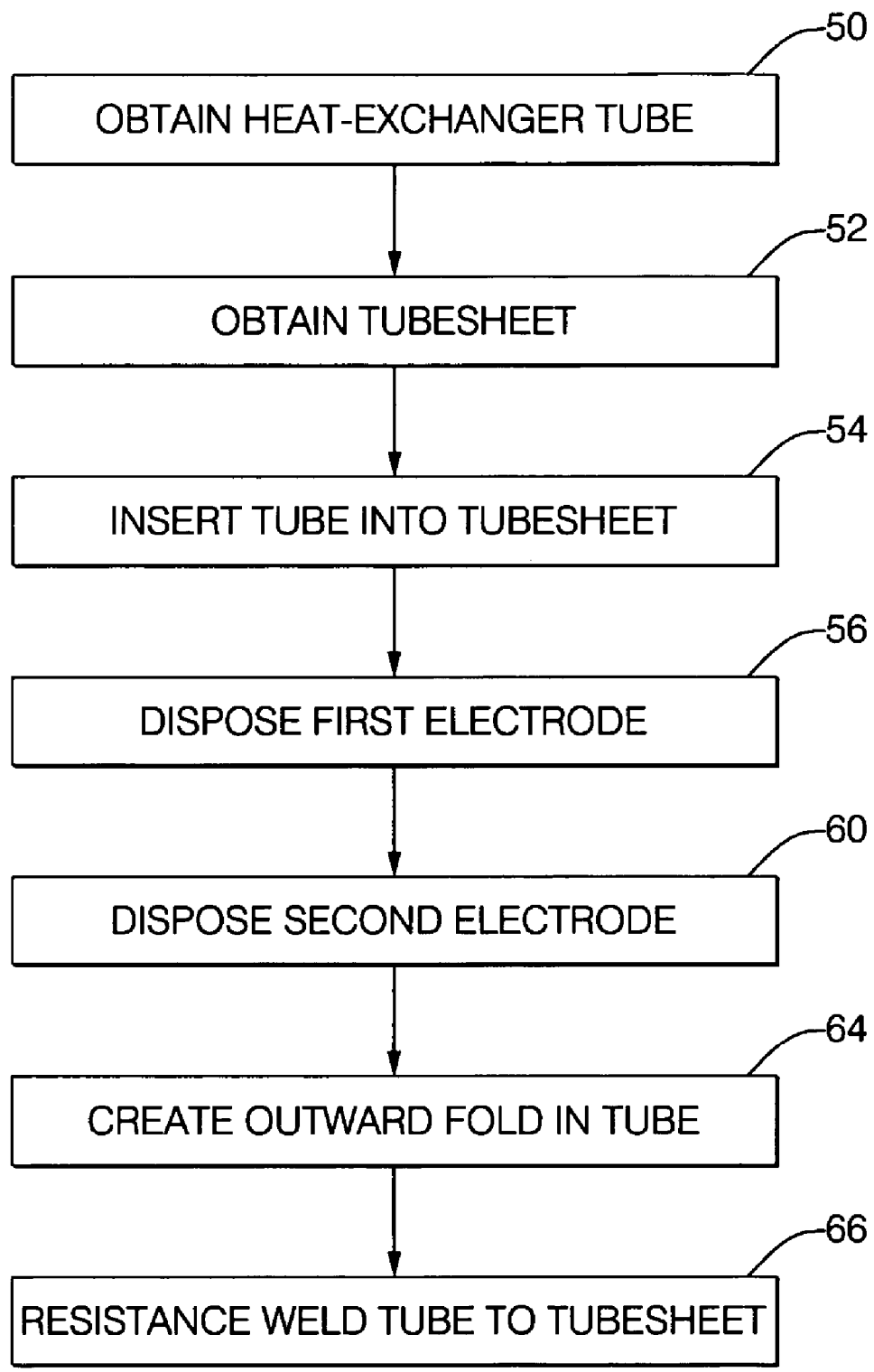
FIG. 4 is a block diagram of a second method of the invention.

Referring to FIGS. 1-3, a first method of the invention is for welding and includes steps a) through f). Step a) is labeled as "Obtain Heat-Exchanger Tube" in block 10 of FIG. 1. Step a) includes obtaining a heat-exchanger tube 12 having first and second tube ends 14 and 16 and having a first outward fold 18 disposed toward the first tube end 14. Step b) is labeled as "Obtain Tubesheet" in block 20 of FIG. 1. Step b) includes obtaining a heat-exchanger first tubesheet 22 having an outward-facing side 24 and an opposing inward-facing side 26 and having an orifice 28. Step c) is labeled as "Insert Tube Into Tubesheet" in block 30 of FIG. 1. Step c) includes inserting the tube 12 at least partially through the orifice 28 of the first tubesheet 22 with the first outward fold 18 contacting one of the outward-facing side 24 and the inward-facing side 26 of the first tubesheet 22. Step d) is labeled as "Dispose First Electrode" in block 32 of FIG. 1. Step d) includes disposing a first electrode 34 in contact with the first outward fold 18. Step e) is labeled as "Dispose Second Electrode" in block 36 of FIG. 1. Step e) includes disposing a second electrode 38 in contact with the one of the outward-facing side 24 and the inward-facing side 26 of the first tubesheet 22. Step f) is labeled as "Resistance Weld Tube To Tubesheet" in block 40 of FIG. 1. Step f) includes using (i.e., passing electric current between) the disposed first and second electrodes 34 and 38 to resistance weld the first outward fold 18 of the tube 12 to the first tubesheet 22.

Describing the first outward fold 18 as being disposed toward the first tube end 14 means the first outward fold 18 is disposed closer to the first tube end 14 than to the second tube end 16. In one example, the first outward fold 18 is disposed proximate the first tube end 14 of the tube 12 as shown in FIG. 2. By proximate is meant that the distance from the first outward fold 18 to the first tube end 14 is less than ten percent of the distance from the midpoint of the tube 12 to the first tube end 14. In one variation, the first outward fold (such as 18' of tube 12') is disposed at the first tube end 14. In one modification, the first outward fold 18 is a completely annular fold of the tube wall of the tube 12. In the same or a different modification, the first outward fold 18 is a substantially transversely-extending fold of the tube wall of the tube. Other shapes of the first outward fold of the tube (i.e., of the tube wall of the tube) are left to the artisan.

Describing the first tubesheet 22 as having an outward-facing side 24 and an inward facing side 26 is meant that outward-facing side 24 is the side of the first tubesheet 22 that will be facing away from the midpoint of the tube 12 after welding and that the inward-facing side 26 is the side of the first tubesheet 22 that will be facing toward the midpoint of the tube 12 after welding. In one construction, the tube 12 has a substantially circularly annular shape. In a different construction, the tube has a substantially rectangular shape. Other shapes of the tube, including non-straight tubes, are left to the artisan.

In one enablement of the first method, step c) inserts the tube 12 completely through the orifice 28 of the first tubesheet 22. In one variation, the one of the outward-facing side 24 and the inward-facing side 26 of the first tubesheet 22 is the outward-facing side 24 of the first tubesheet 22. In this variation, the first outward fold 18 is disposed in contact with the outward-facing side 24 of the first tubesheet 22. In the different enablement and/or variation, the one of the outward-facing side 24 and the inward-facing side 26 of the first tubesheet 22 is the inward-facing side 26 of the first tubesheet 22. Here, the first outward fold 18 is disposed in contact with the inward-facing side 26 of the first tubesheet 22.

In one implementation of the first method, step f) includes moving the first electrode 34 to deform the first outward fold 18 against the first tubesheet 22. With such movement, step f) can be described as deformation resistance welding the first outward fold 18 of the tube 12 to the first tubesheet 22. In some implementations, such as heat exchangers for boilers, the first tubesheet 22 is thick enough for a fixture (not shown) to simply immobilize the first tubesheet 22 during deformation. In other implementations, such as vehicle radiators, a fixture supplying additional support on the opposing side of the tubesheet proximate the first electrode is employed as can be appreciated by the artisan. In one operation of the first method, a stop (not shown) is provided to limit the movement of the first electrode.

In a first extension of the first method, the first method also includes steps g) through k). Step g) includes obtaining a heat-exchanger second tubesheet 42 having an outward-facing side 24 and an opposing inward-facing side 26 and having an orifice 28. Step h) includes inserting the tube 12 at least partially through the orifice 28 of the second tubesheet 42. Step i) includes creating a second outward fold 44 in the tube 12 toward the second tube end 16 of the tube 12. Step j) includes disposing the second outward fold 44 in contact with one of the outward-facing side 24 and the inward-facing side 26 of the second tubesheet 42. Step k) includes, after steps g) through j), resistance welding the second outward fold 44 of the tube 12 to the second tubesheet 42.

In one employment of the first extension of the first method, the second outward fold 44 is created using tube hydroforming techniques, as is known to those skilled in the art. In a different employment, later described in detail, the first electrode is shaped to create the second outward fold (and in one variation to also create the first outward fold). Other techniques for creating the second outward fold 44 are left to the artisan.

In one application of the first extension of the first method, step h) inserts the tube 12 completely through the orifice 28 of the second tubesheet 42. In the same or a different application, step k) includes disposing the first electrode 34 in contact with the second outward fold 44 and disposing the second electrode 38 in contact with the one of the outward-facing side 24 and the inward-facing side 26 of the second tubesheet 42. In the same or a different application, the first extension of the first method also includes, before steps h) through k), the steps of obtaining a baffle 46 having a through hole 48 and inserting the tube 12 completely through the through hole 48. In one utilization, several baffles 46 are used and act to reduce tube vibration.

Referring to FIGS. 2 and 4-6, a second method of the invention is for welding and includes steps a) through g). Step a) is labeled as "Obtain Heat-Exchanger Tube" in block 50 of FIG. 4. Step a) includes obtaining a heat-exchanger tube 12' having first and second tube ends 14 and 16. Step b) is labeled as "Obtain Tubesheet" in block 52 of FIG. 4. Step b) includes obtaining a heat-exchanger first tubesheet 22 having an outward-facing side 24 and an opposing inward-facing side 26 and having an orifice 28. Step c) is labeled as "Insert Tube Into Tubesheet" in block 54 of FIG. 4. Step c) includes inserting the tube 12' at least partially through the orifice 28 of the first tubesheet 22. Step d) is labeled as "Dispose First Electrode" in block 56 of FIG. 4. Step d) includes disposing a first electrode 58 in contact with the first tube end 14 of the tube 12'. Step e) is labeled as "Dispose Second Electrode" in block 60 of FIG. 4. Step e) includes disposing a second electrode 62 in contact with one of the outward-facing side 24 and the inward-facing side 26 of the first tubesheet 22. Step f) is labeled as "Create Outward Fold In Tube" in block 64 of FIG. 4. Step f) includes moving the disposed first electrode 58 against the first tube end 14 to create a first outward fold 18' in the tube 12' toward the first tube end 14 with the first outward fold 18' contacting the one of the outward-facing side 24 and the inward-facing side 26 of the first tubesheet 22. Step g) is labeled as "Resistance Weld Tube To Tubesheet" in block 66 of FIG. 4. Step g) includes using the disposed first and second electrodes 58 and 62 to resistance weld the first outward fold 18' of the tube 12' to the first tubesheet 22.

It is noted that the enablements, implementations, extensions, applications, etc. of the previously-described first method are equally applicable to the second method. In one example of an extension of the second method, the step of creating a second outward fold 44' includes moving the first electrode 58 against the second tube end 16 to create the second outward fold 44' in the tube 12'. In one utilization of the second method, one or more fixtures (not shown) are provided to support the tube 12' and the first and second tubesheets 22 and 42.

Figure 7:
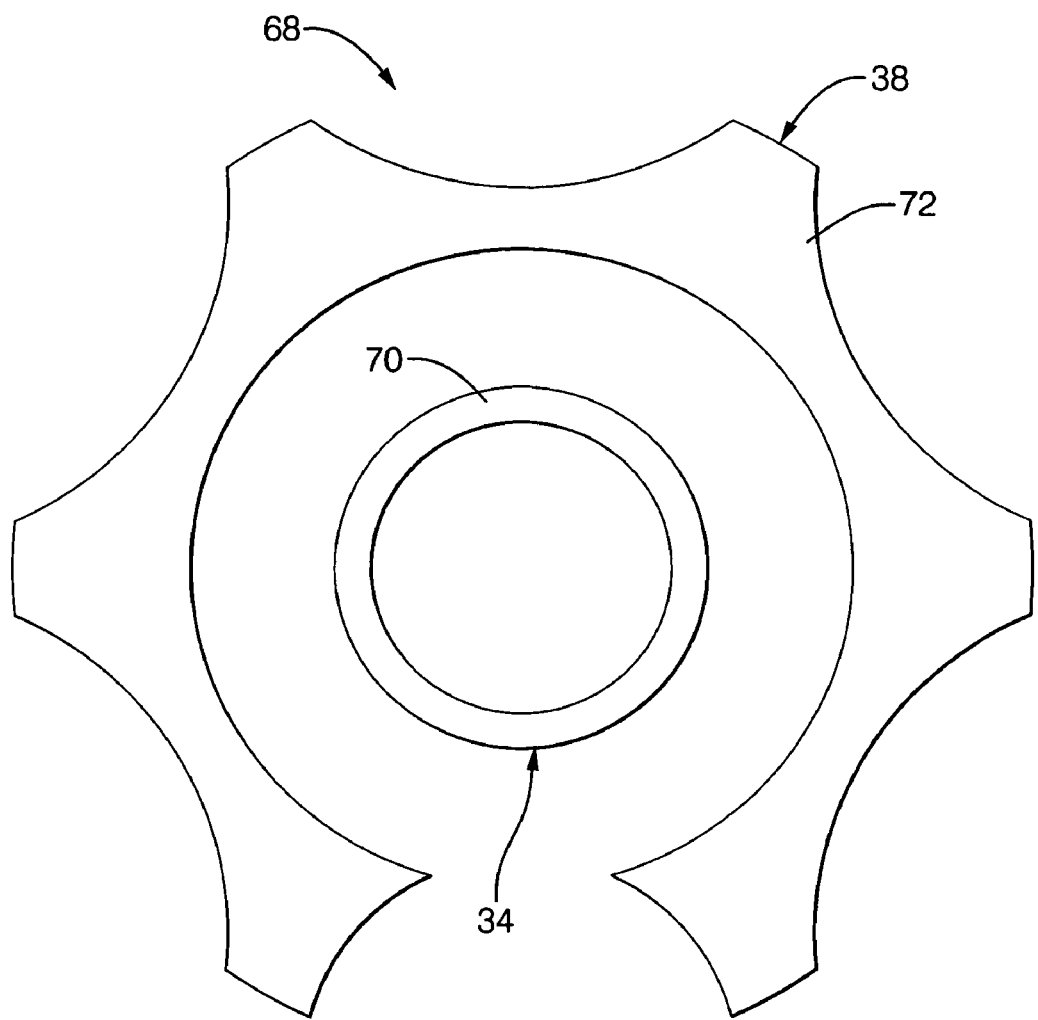
FIG. 7 is an end view of the first and second electrodes of FIG. 3.

Referring to FIGS. 2-3 and 7, a first embodiment of the invention is for a welding apparatus 68 which includes a resistance-welding first electrode 34 and a resistance-welding second electrode 38. The first electrode 34 has an electrode surface 70 adapted to contact an outward end fold 18 of a heat-exchanger tube 12 which is disposed in an orifice 28 of a heat-exchanger tubesheet 22 with the outward fold 18 contacting an outward-facing side 24 of the tubesheet 22. The second electrode 38 has an electrode surface 72 adapted to contact the outward-facing side 24 of the tubesheet 22.

In one enablement of the embodiment of FIGS. 2-3 and 7, the first electrode 34 is movable, with respect to the second electrode 38, to deform the contacted outward end fold 18 against the tubesheet 22. In this enablement, the first and second electrodes 34 and 38 are employed to deformation resistance weld the outward fold 18 of the tube 12 to the tubesheet 22.

Figure 8:
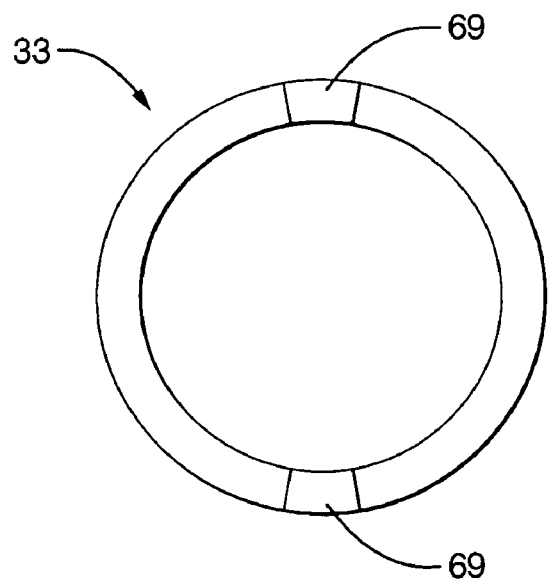
FIG. 8 is an end view of an alternate first electrode which can replace the first electrode of FIG. 3.

In one deployment of the embodiment of FIGS. 2-3 and 7, wherein the outward end fold 18 is an annular outward fold 18, the electrode surface 70 of the first electrode 34 is an annular electrode surface 70 (as shown in FIG. 7) adapted to make complete annular contact with the annular outward end fold 18 of the tube 12. In a different deployment with an alternate first embodiment of the first electrode 33 shown in FIG. 8, wherein the outward end fold 18 is an annular outward end fold 18, the first electrode 33 has annularly spaced-apart surface segments 69 adapted to make segmented annular contact with the annular outward end fold 18 of the tube 12.

In one configuration of the embodiment of FIGS. 2-3 and 7, the electrode surface 70 of the first electrode 34 is a circularly annular electrode surface 70, and the electrode surface 72 of the second electrode 38 is a partially or completely annular electrode surface 72 which has a circular inside diameter and which is radially outwardly spaced apart from the circularly annular electrode surface 70 of the first electrode 34. In one variation, the circularly annular electrode surface 70 of the first electrode 34 is movable, with respect to the annular electrode surface 72 of the second electrode 38, to deform the contacted outward end fold 18 against the tubesheet 22. In one modification, the annular electrode surface 72 of the second electrode 38 has a fluted outer perimeter to avoid contact with any adjacent additional heat-exchanger tube 12. In one employment, the first electrode 34 welds one tube 12 at a time to the tubesheet 22, and the second electrode 38 surrounds only the one tube 12 at a time. In one arrangement, not shown, where tubes are spaced closely together, the first electrode includes a plurality of first sub-electrodes and/or the second electrode includes a plurality of second sub-electrodes, wherein resistance-welding current flows between the first and second sub-electrodes.

Figure 5:
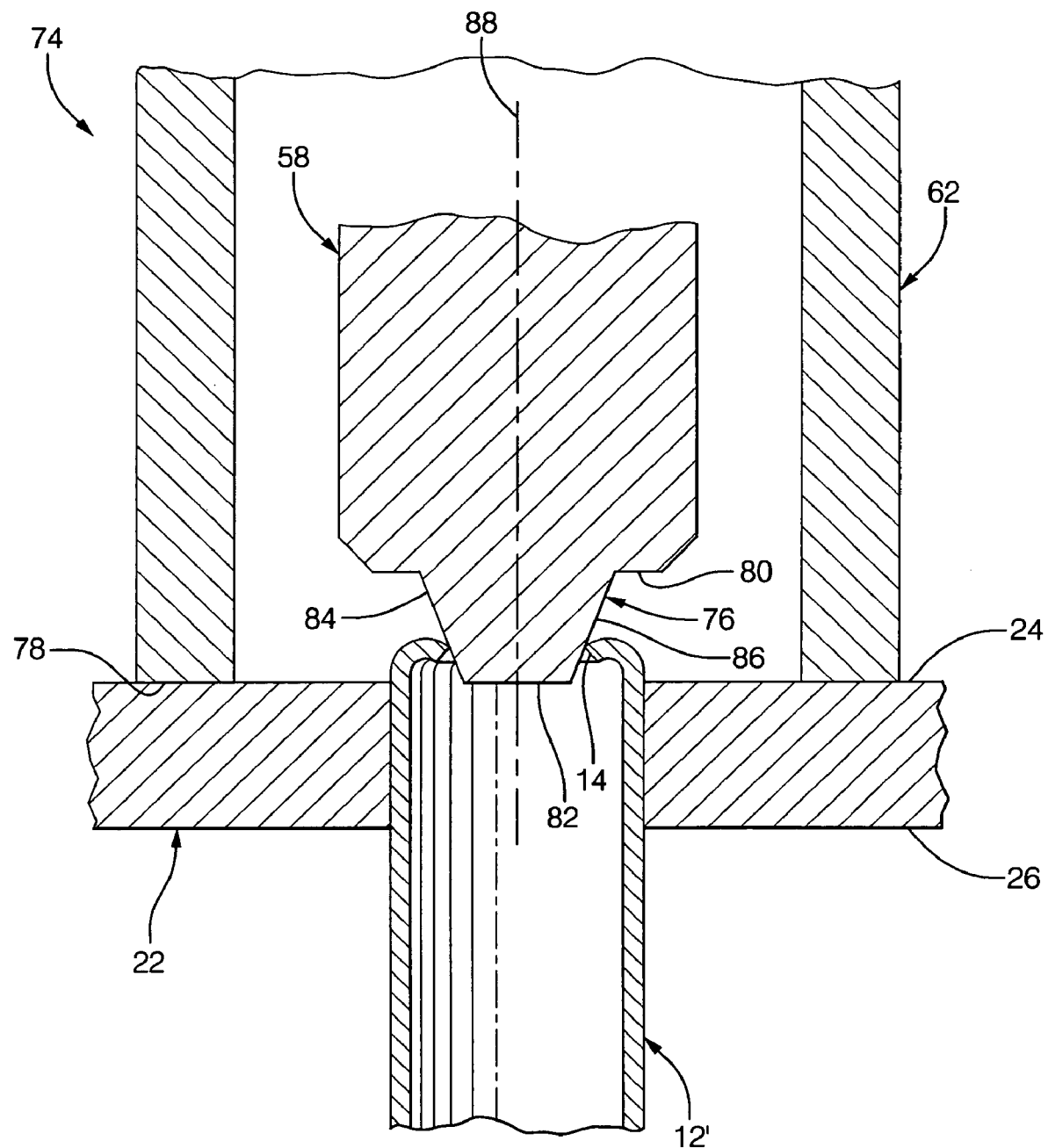
FIG. 5 is a schematic cross sectional view of a second embodiment of first and second electrodes which can be used in welding a heat-exchanger tube to the first and second tubesheets in accordance with one example of the second method of the invention.
Figure 6:
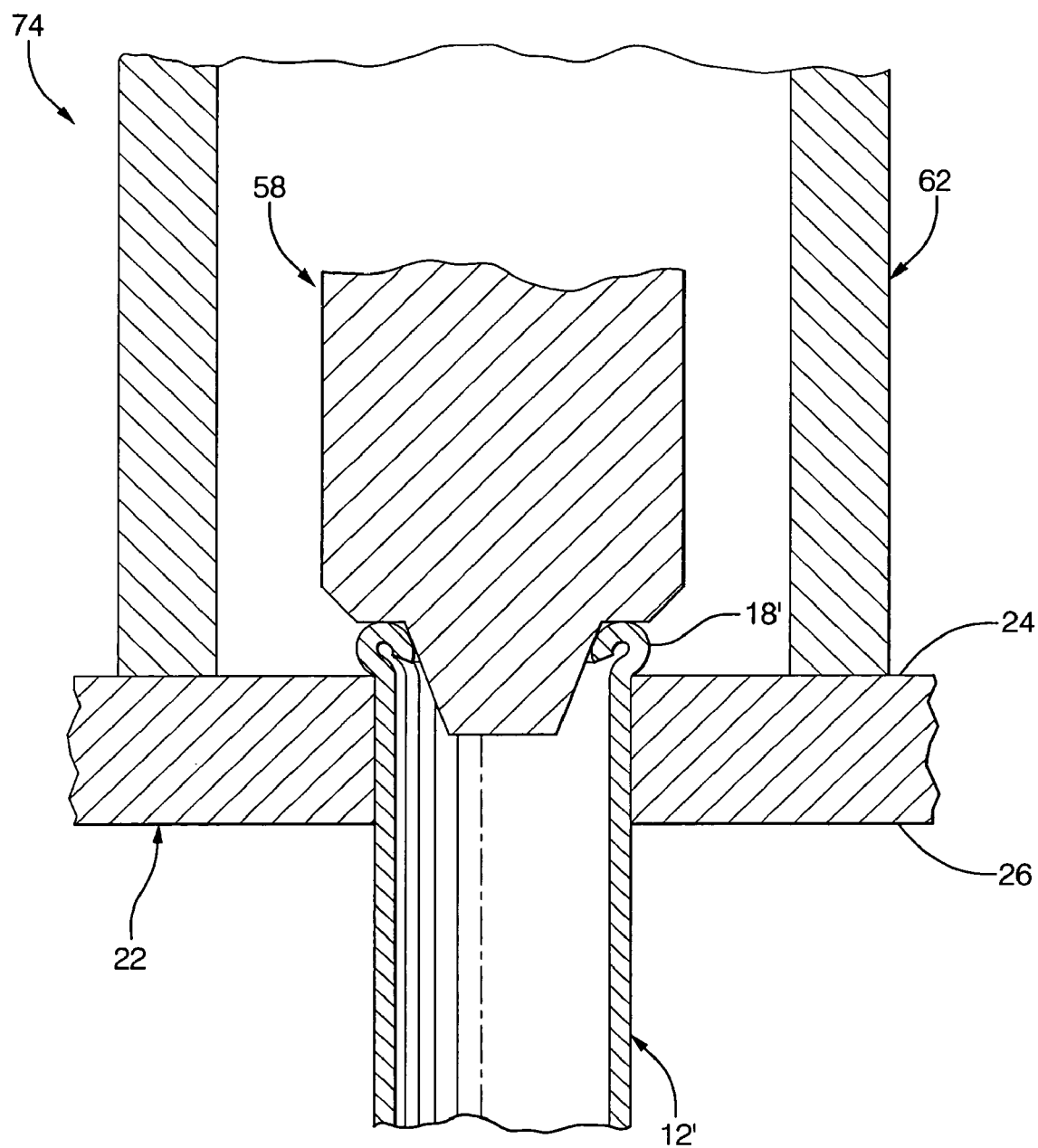
FIG. 6 is a view, as in FIG. 5, but at a later time during the one example of the second method of the invention.

Referring to FIGS. 2 and 5-6, a second embodiment of the invention is for a welding apparatus 74 which includes a resistance-welding first electrode 58 and a resistance-welding second electrode 62. The first electrode 58 has an electrode surface 76 adapted to contact a tube end 14 of a heat exchanger tube 12' disposed in an orifice 28 of a heat-exchanger tubesheet 22. The second electrode 62 has an electrode surface 78 adapted to contact an outward-facing side 24 of the tubesheet 22, wherein the first electrode 58 is movable, with respect to the second electrode 62, to create an outward end fold 18' in the tube 12' and deform the outward end fold 18' against the outward-facing side 24 of the tubesheet 22.

In one enablement of the embodiment of FIGS. 2 and 5-6, the outward end fold 18' is an annular outward end fold 18', and the electrode surface 76 of the first electrode 58 includes an annular ledge 80 adapted to make complete annular contact with the annular outward end fold 18' of the tube 12'. In one variation, the first electrode 58 includes an electrode end 82, and the electrode surface 76 of the first electrode 58 includes a tapered portion 84 which extends from the annular ledge 80 to the electrode end 82. In one modification, the tapered portion 84 is a conical portion 86. In one configuration, the first electrode 58 has a longitudinal axis 88, and the annular ledge 80 is a substantially-circular annular ledge 80 which is substantially perpendicular to the longitudinal axis 88. In one arrangement, the conical portion 86 is a truncated conical portion 86. In one usage, the first electrode 58 is moved such that the truncated conical portion 86 of the electrode surface 76 of the first electrode 58 bends the tube end 14 of the tube 12' as shown in FIG. 5, and such that thereafter the substantially-circular annular ledge 80 bends the tube end 14 of the tube 12' as shown in FIG. 6 creating the annular outward end fold 18'.

Figure 9:
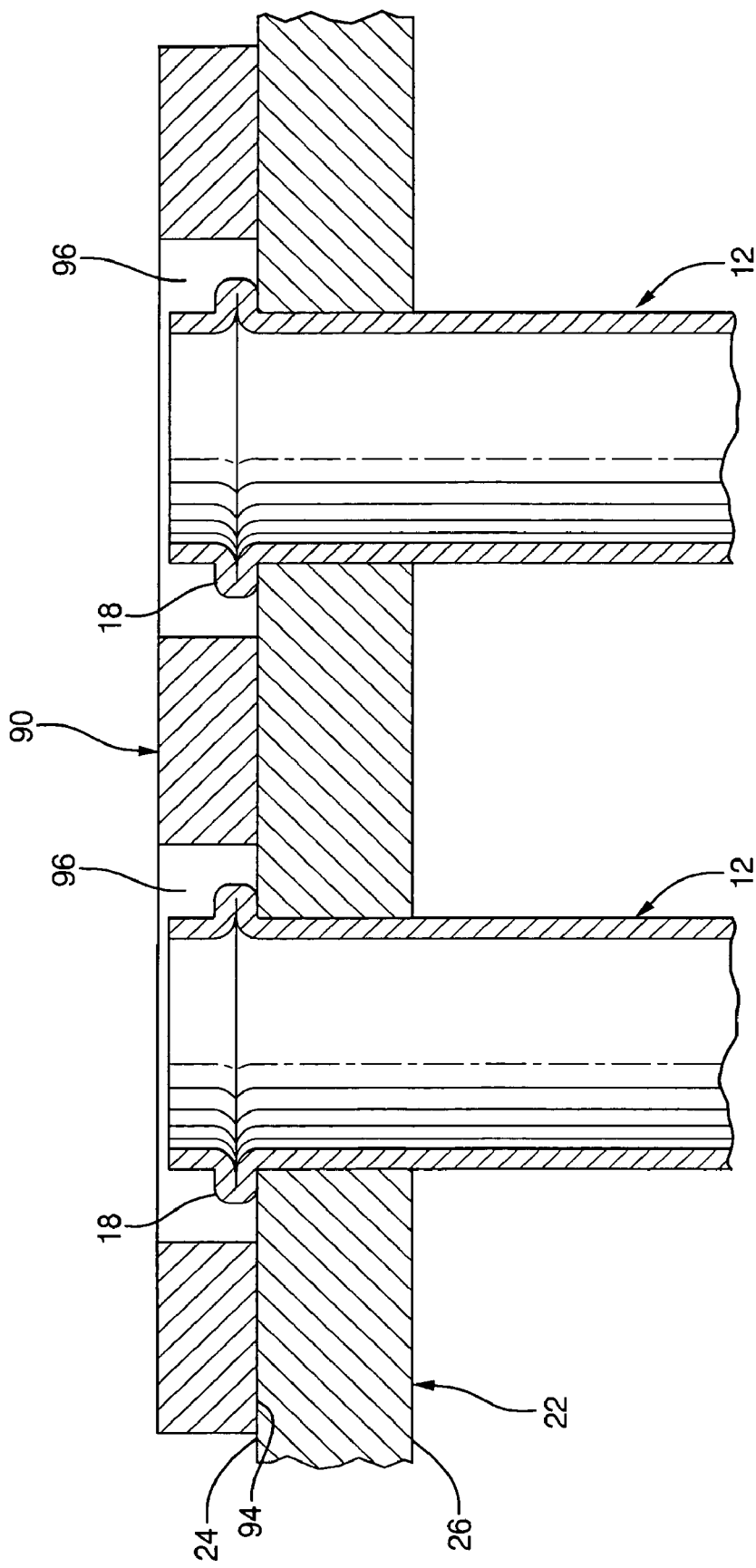
FIG. 9 is a cross sectional view of an embodiment of a second electrode which has a plurality of cutouts each surrounding a corresponding one of a plurality of tubes.

Another embodiment of a second electrode 90 is shown together with a tubesheet 22 in FIG. 9. A third embodiment of a welding apparatus of the invention includes a first electrode combination which combines the first electrode 34 of the embodiment of FIGS. 2-3 and 7 and the second electrode 90 of FIG. 9. In the first electrode combination, the welding apparatus includes a resistance-welding first electrode 34 and a resistance-welding second electrode 90. The first electrode 34 has an electrode surface 70 adapted to contact an end portion 92 of at least one of a plurality of heat-exchanger tubes 12 which are disposed in corresponding orifices 28 of a heat-exchanger tubesheet 22 wherein the end portion 92 protrudes from an outward-facing side 24 of the tubesheet 22. The second electrode 90 has an electrode surface 94 adapted to contact the outward-facing side 24 of the tubesheet 22 and has cutouts 96 which surround each of the plurality of tubes 12 and which are adapted to receive the first electrode 34.

Figure 10:
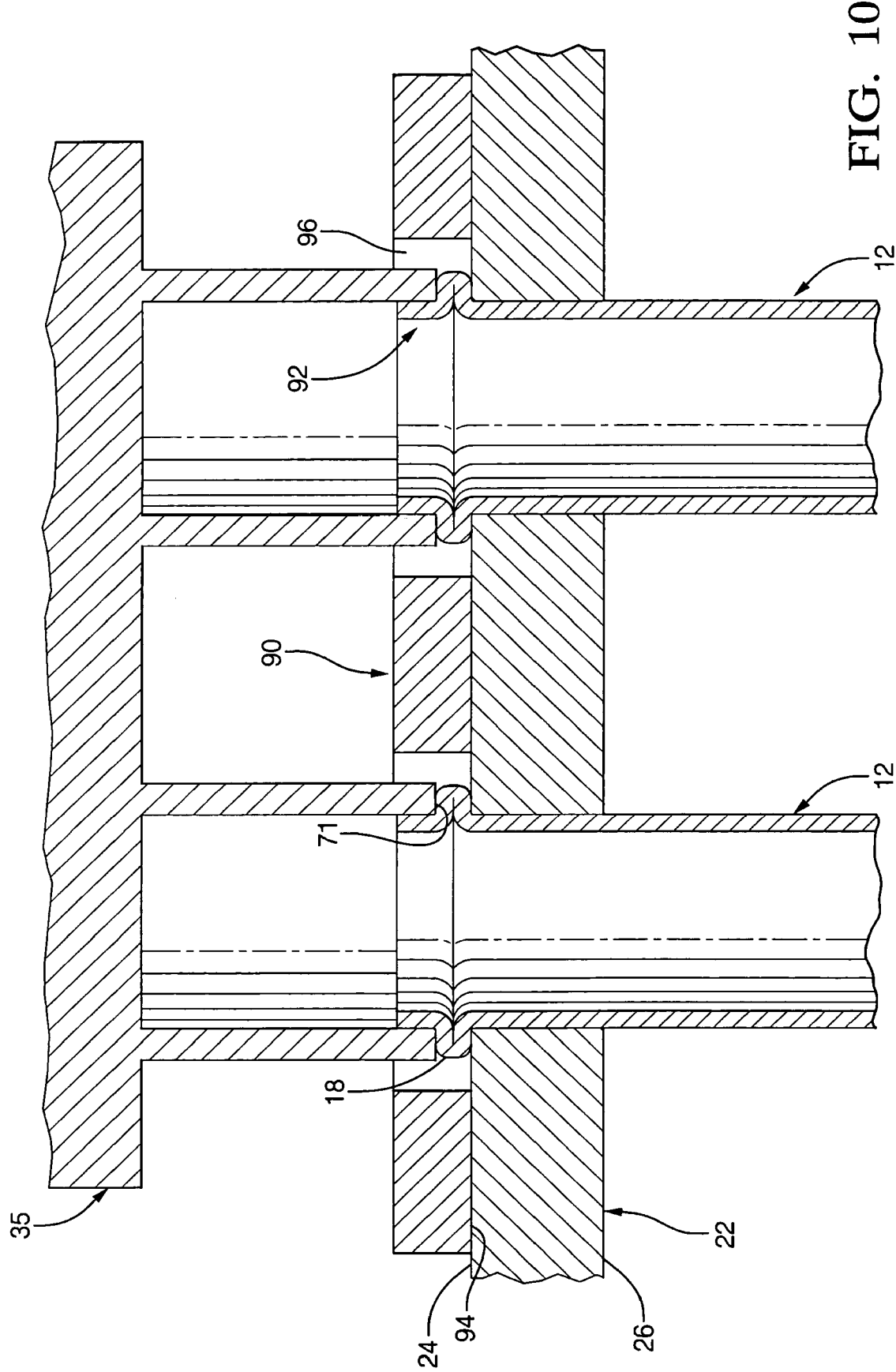
FIG. 10 is a cross sectional view of an embodiment of first and second electrodes which can be used to simultaneously weld a plurality of heat-exchanger tubes to a tubesheet in accordance with one elaboration of the first method.

In one employment of the first electrode combination, the end portion 92 includes an outward end fold 18, and the electrode surface 70 of the first electrode 34 is adapted to contact the outward end fold 18 of the at-least-one tube 12. In one variation, the electrode surface 70 of the first electrode 34 is adapted to contact only one at a time the outward end fold 18 of each of the plurality of tubes 12, and the first electrode 34 is movable, with respect to the second electrode 38, to deform the contacted outward end fold 18 against the tubesheet 22. In a different variation, shown in FIG. 10, the electrode surface 71 of the first electrode 35 is adapted to contact substantially simultaneously the outward end fold 18 of each of the plurality of tubes 12, and the first electrode 35 is movable, with respect to the second electrode 90, to deform the contacted outward end folds 18 against the tubesheet 22. The later variation can be visualized as a first electrode 35 having at least two first electrode portions movable together as a unit, with each first electrode portion being a first electrode 34 shown in FIGS. 3 and 7. In one design, not shown, the second electrode includes two second electrode portions disposed in contact with each other at an overlapping joint.

A fourth embodiment of a welding apparatus of the invention includes a second electrode combination which combines the first electrode 58 of the embodiment of FIGS. 2 and 5-6 and the second electrode 90 of FIG. 9. It is noted that the end portion 92' of the tube 12' includes a tube end 14. In the second electrode combination, the welding apparatus includes a resistance-welding first electrode 58 and a resistance-welding second electrode 90. The electrode surface 76 of the first electrode 58 is adapted to contact the tube end 14 of the at-least-one tube 12', wherein the first electrode 58 is movable, with respect to the second electrode 62, to create an outward end fold 18' in the at-least-one tube 12' and deform the outward end fold 18' of the at-least-one tube 12' against an outward-facing side 24 of the tubesheet 22. The second electrode 90 has an electrode surface 94 adapted to contact the outward-facing side 24 of the tubesheet 22 and has cutouts 96 which surround each of the plurality of tubes 12' and which are adapted to receive the first electrode 34.

Figure 11:
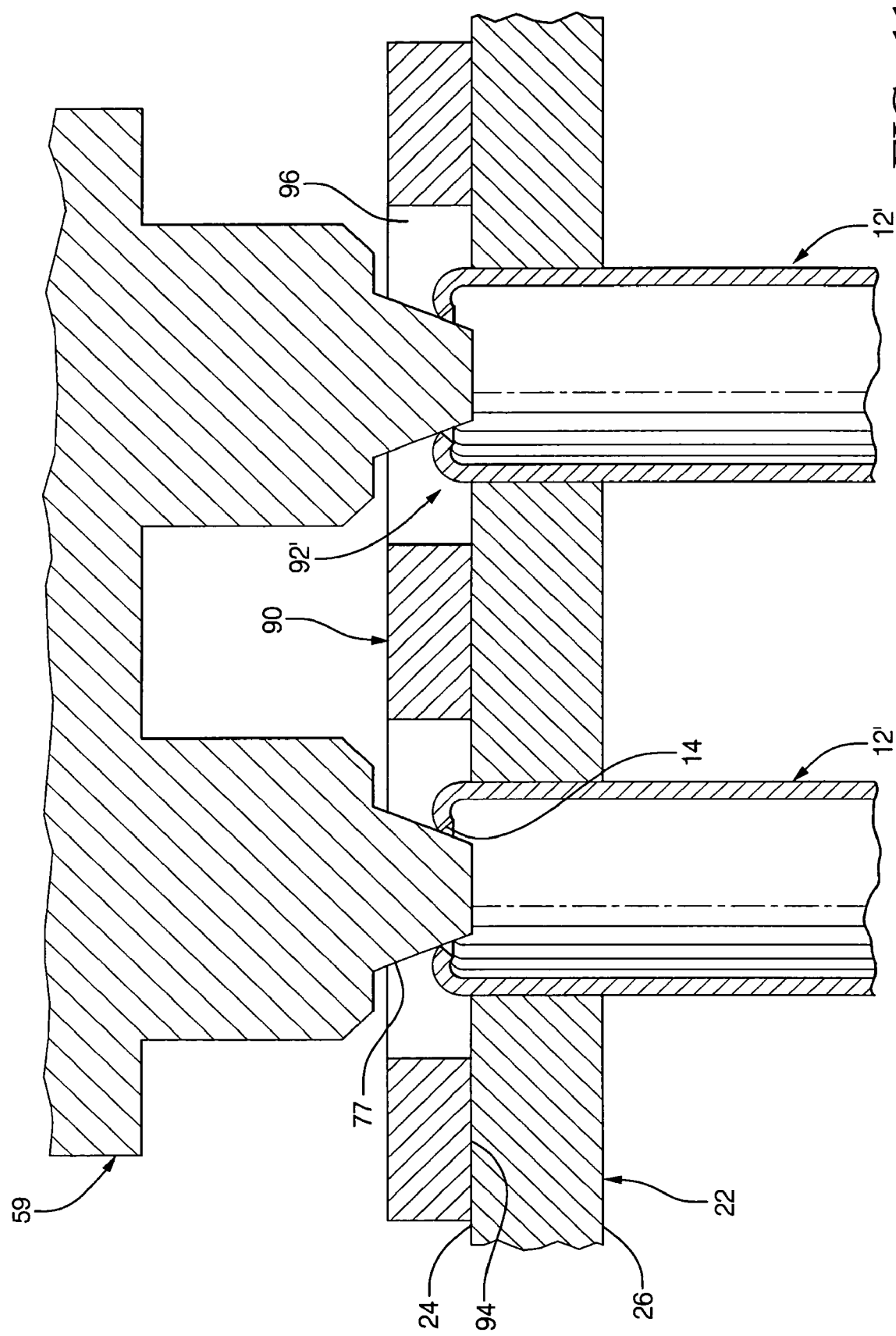
FIG. 11 is a cross sectional view of an embodiment of first and second electrodes which can be used to simultaneously weld a plurality of heat-exchanger tubes to a tubesheet in accordance with one elaboration of the second method.

In one variation of the second electrode combination, the electrode surface 76 of the first electrode 58 is adapted to contact only one at a time the tube end 14 of each of the plurality of tubes 12'. In a different variation, shown in FIG. 11, the electrode surface 77 of the first electrode 59 is adapted to contact substantially simultaneously the tube end 14 of each of the plurality of tubes 12'. The later variation can be visualized as a first electrode 59 having at least two first electrode portions movable together as a unit, with each first electrode portion being a first electrode 58 shown in FIGS. 5-6.

Several benefits and advantages are derived from one or more of the embodiments of the invention. Welding using electric current is less expensive than gas metal arc welding or friction welding. Welding using electric current also has a shorter cycle time between welds than gas metal arc welding or friction welding. In one example, the first electrode moves to deform the first outward fold against the first tubesheet, wherein such deformation resistance welding allows solid state welds of dissimilar materials without the formation of brittle intermetallic compounds. In one variation, having the first electrode also create the outward fold streamlines the welding process. Having resistance-welding first and second electrodes adapted to contact, respectively, the tube and the tubesheet on the same side of the tubesheet provides for an efficient welding process, as can be appreciated by those skilled in the art.

The foregoing description of several methods and embodiments of the invention has been presented for purposes of illustration. It is not intended to be exhaustive or to limit the invention to the precise procedures or precise forms disclosed, and obviously many modifications and variations are possible in light of the above teaching. It is intended that the scope of the invention be defined by the claims appended hereto.

The invention claimed is:

1. A welding apparatus comprising:
   a) a resistance-welding first electrode having a central longitudinal axis and a longitudinally endmost and tube-contacting electrode surface substantially coaxially aligned with the central longitudinal axis and adapted to physically contact an outward end fold of a heat-exchanger tube which is disposed in an orifice of a heat-exchanger tubesheet with the outward end fold contacting an outward-facing side of the tubesheet; and
   b) a resistance-welding second electrode having a longitudinally endmost and tubesheet-facing-and-contacting electrode surface substantially coaxially aligned with the central longitudinal axis and adapted to physically contact the outward-facing side of the tubesheet, wherein the first electrode is disposed longitudinally and transversely within the second electrode during welding, wherein the tube-contacting electrode surface of the first electrode and the tubesheet-contacting electrode surface of the second electrode are substantially parallel and face substantially in a same direction, wherein the electrode surface of the first electrode is a circularly annular electrode surface, wherein the electrode surface of the second electrode is a partially or completely annular electrode surface which has a circular inside diameter and which is radially outwardly spaced apart from the circularly annular electrode surface of the first electrode, and wherein the annular electrode surface of the second electrode has a fluted outer perimeter to avoid physical contact with any adjacent additional heat-exchanger tube.

2. A welding apparatus comprising:
   a) a resistance-welding first electrode having a central longitudinal axis and an electrode surface adapted to physically contact a tube end of a heat exchanger tube disposed in an orifice of a heat-exchanger tubesheet; and
   b) a resistance-welding second electrode having a tubesheet-contacting electrode surface adapted to physically contact an outward-facing side of the tubesheet, wherein the first electrode is movable, with respect to the second electrode, to create an outward end fold in the tube and deform the outward end fold against the outward-facing side of the tubesheet, wherein the outward end fold is an annular outward end fold, wherein the electrode surface of the first electrode includes a tube-contacting, transversely-extending annular ledge which is substantially perpendicular to the central longitudinal axis and which is adapted to make complete physical annular contact with the annular outward end fold outside the tube, wherein the first electrode is disposed longitudinally and transversely within the second electrode during welding, wherein the tube-contacting annular ledge of the first electrode and the tubesheet-contacting electrode surface of the second electrode are substantially parallel and face substantially in a same direction, wherein the first electrode includes an electrode end, and wherein the electrode surface of the first electrode includes a tapered portion which extends from the annular ledge to the electrode end.

3. The welding apparatus of claim 2, wherein the tapered portion is a conical portion.

4. The welding apparatus of claim 3, wherein the first electrode has a longitudinal axis, and wherein the annular ledge is a substantially-circular annular ledge which is substantially perpendicular to the longitudinal axis.

5. The welding apparatus of claim 4, wherein the conical portion is a truncated conical portion.

* * * * *